M. B. LLOYD.
TUBE WELDING PROCESS.
APPLICATION FILED MAR. 10, 1914.
1,124,766.
Patented Jan. 12, 1915.
7 SHEETS—SHEET 6.
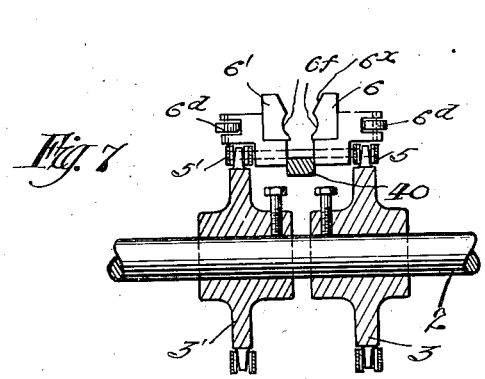
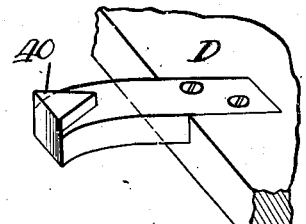
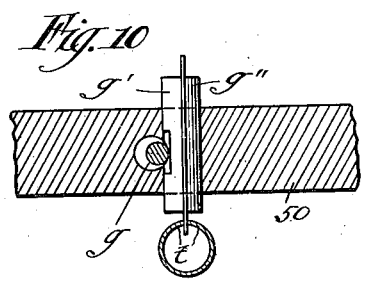
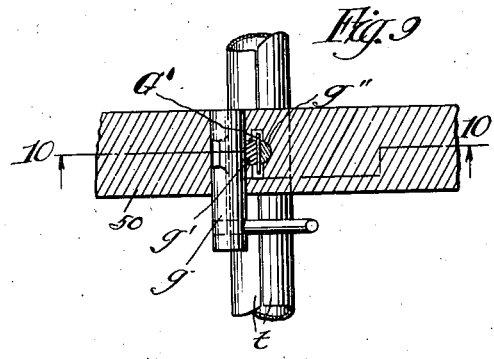
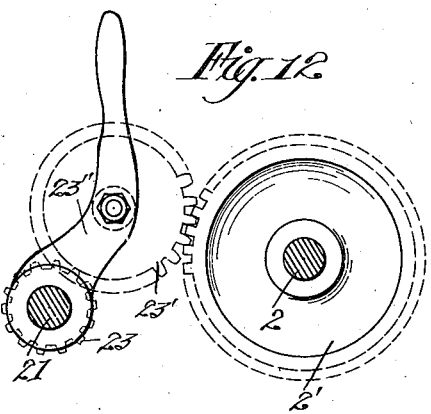
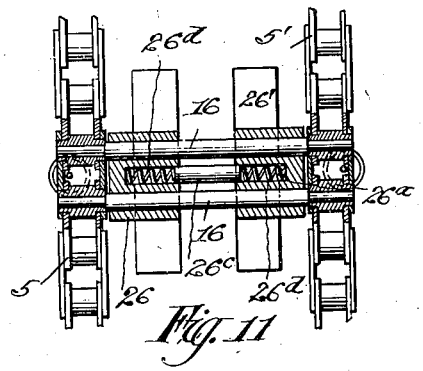
Inventor:
Marshall B. Lloyd
Witnesses:

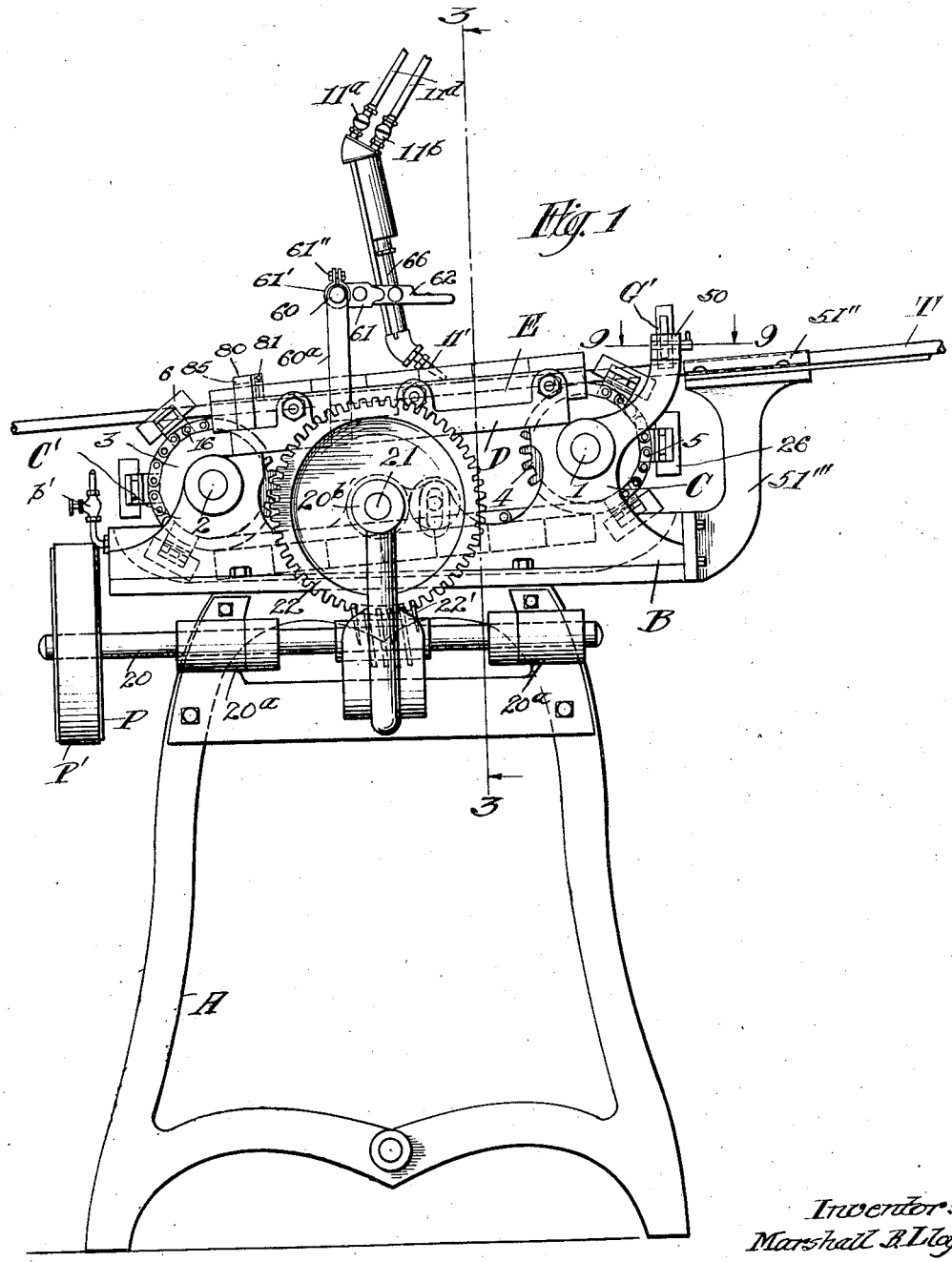

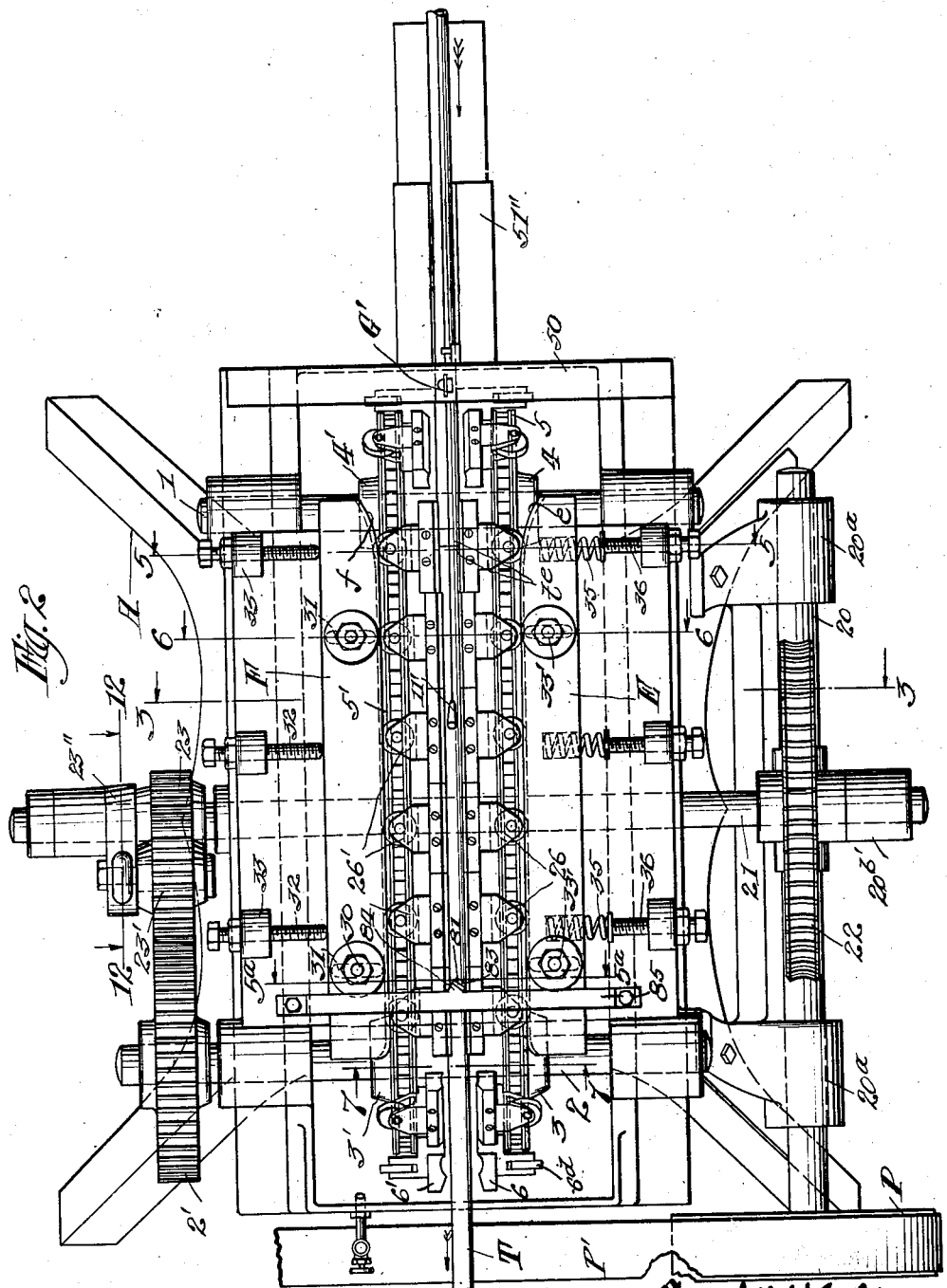

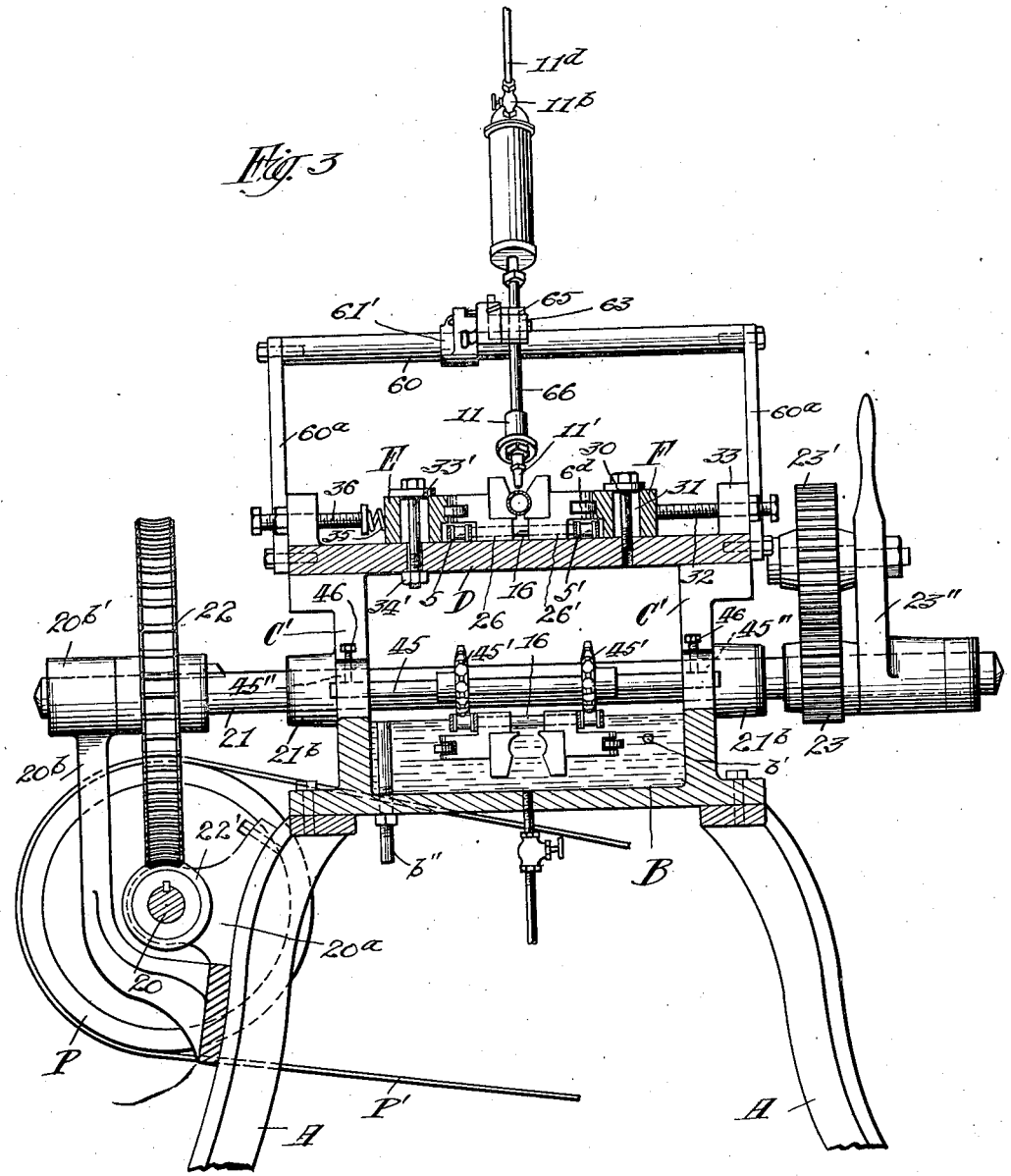

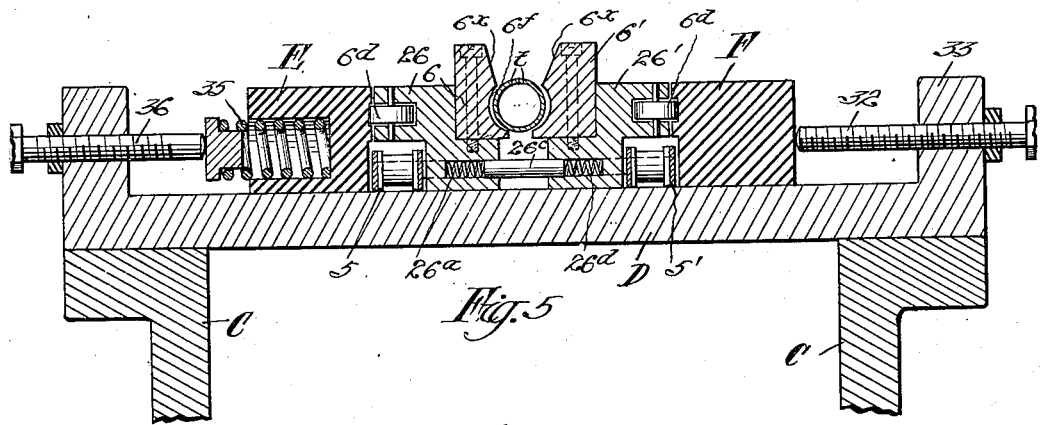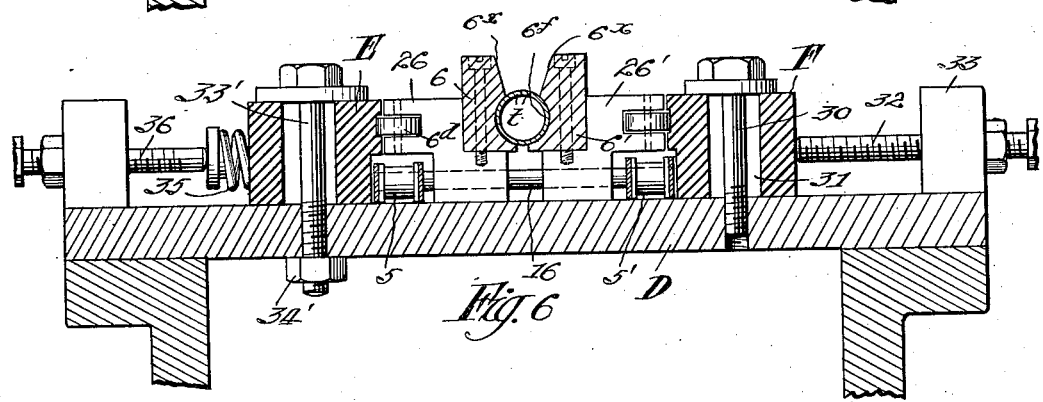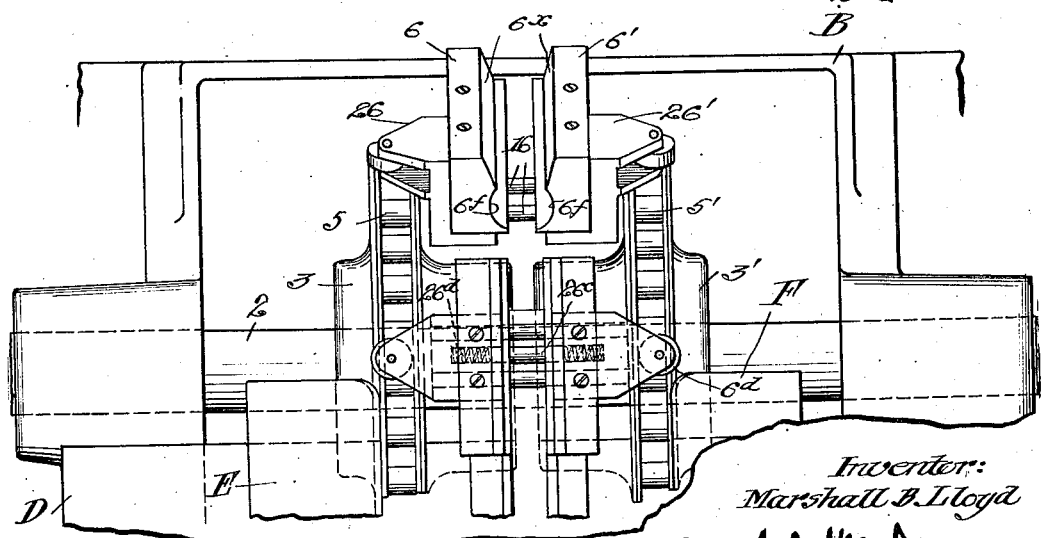

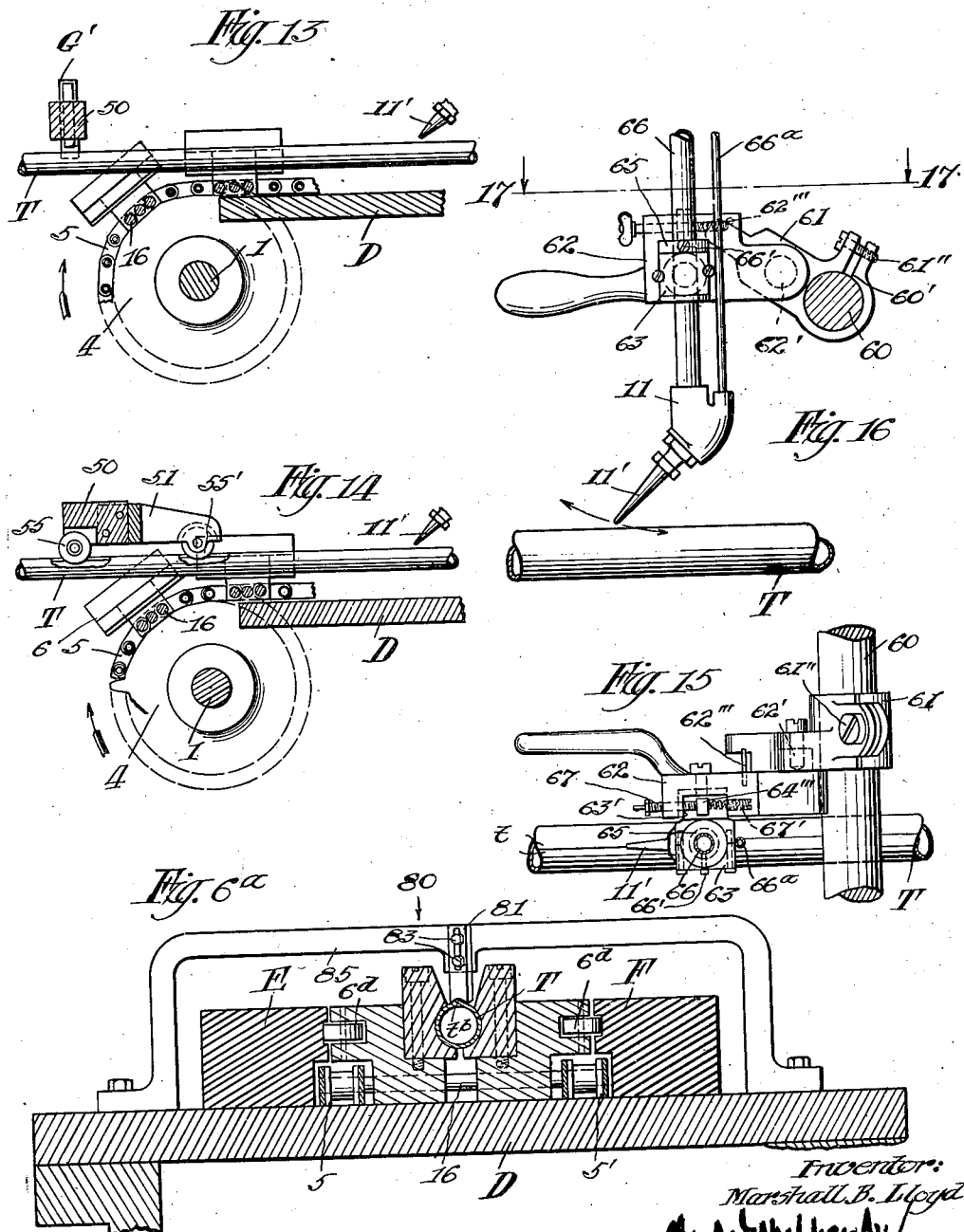

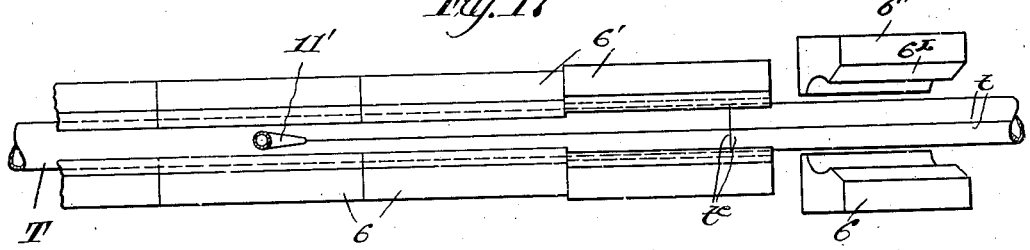
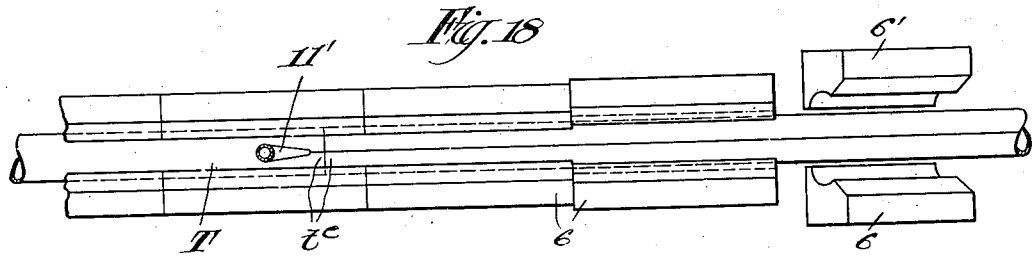
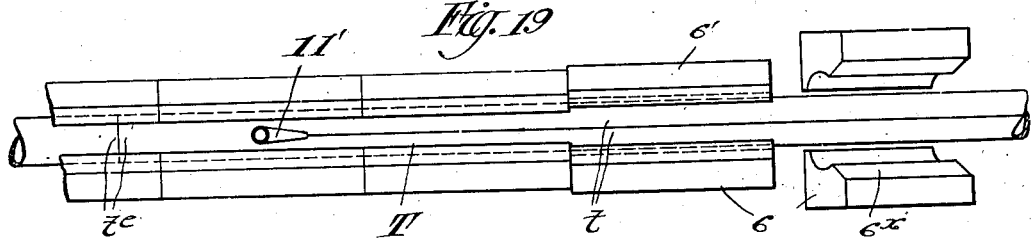

UNITED STATES PATENT OFFICE.

MARSHALL BURNS LLOYD, OF MENOMINEE, MICHIGAN, ASSIGNOR, BY MESNE ASSIGNMENTS, TO THE ELYRIA IRON & STEEL COMPANY, OF ELYRIA, OHIO, A CORPORATION OF OHIO.

TUBE-WELDING PROCESS.

1,124,766.

Specification of Letters Patent. Patented Jan. 12, 1915.

Original application filed April 6, 1912, Serial No. 689,092. Divided and this application filed March 10, 1914. Serial No. 823,789.

*To all whom it may concern:*

Be it known that I, MARSHALL B. LLOYD, a citizen of the United States, and resident of Menominee, county of Menominee, and State of Michigan, have invented a certain new, useful, and Improved Tube-Welding Process, of which the following is a specification.

My invention relates generally to improvements in the processes of manufacturing tubing and has special reference to processes for welding the seams of pre-formed metal tubes.

The present invention is a companion to and a divisional part of my pending application Serial Number 689,092, filed April 6, 1912.

The general object of my invention is the continuous welding of lengths of seamed tubes.

Among the other objects of my invention are, to weld lengths of seamed tubes without waste, *i. e.* to make a perfect welded tube the full length of the seamed tube; to weld seamed tubes rapidly without recourse to the usual step of preliminarily heating the whole tube; to produce such welded tubes at less cost than has been possible hitherto; and to weld them with less labor and greater uniformity.

As will be more fully explained hereinafter, I attain this and other objects by applying forces to hold the seam edges of the metal tube together and to move the tube forward as a whole, applying heat to the seam edges of the tube at a relatively fixed point, as thus held, and welding the same as the tube moves, and before the tube is welded throughout its entire length placing a similar seamed tube in end to end abutment therewith and applying forces thereto to hold the seam edges together and to move the tube forward past the relatively fixed heating zone, and thus continuously welding lengths of tubing. I preferably also apply force to the respective tubes to position or aline the seam thereof with respect to the point of the application of the welding heat.

My invention will be more readily understood by reference to the accompanying drawings forming a part of this specification and in which I have illustrated the several steps comprising my process as practised in a machine which I find best suited to the purposes of my invention.

Figure 1 is a side elevation of my novel welding machine. The tube holding and moving mechanism of this machine comprises an endless traveling vise of novel form. The welding means comprises a welding torch such as an oxy-acetylene gas torch, positioned and operable in a novel manner to direct a welding flame upon the seam edges of the tube. The seam positioning means here comprises a fixed blade or member which enters the open seam of the tube and co-acts with the receiving end or tube guide of the machine to direct the tube into the traveling vise in such manner that when grasped thereby the tube will present a straight seam to the welding flame of the torch. The bur removing means comprises a suitable planer tool or knife rigidly held in alinement with and conforming to the top of the tubing. Fig. 2 is an enlarged plan view of the machine, the welding torch being removed better to disclose other parts of the machine; Fig. 3 is a vertical transverse section substantially on the line 3—3 of Figs. 1 and 2; Fig. 4 is an enlarged detail plan view of the rear portion of the machine at which point the vise jaws separate; Fig. 5 is a transverse section substantially on the line 5—5 of Fig. 2, showing the end of a tube about to be grasped by the vise jaws. Fig. 6 is a sectional detail substantially on the line 6—6 of Fig. 2, showing the tube clamped between the jaws, as when moving forward with the vise jaws. Fig. 6ª is a transverse section substantially on the line 5ª—5ª of Figs. 1 and 2, showing the tube after it is welded, and illustrating the bur removing means; Fig. 7 is a detail section substantially on line 7—7 of Fig. 2 showing the operation of the vise jaw spreader or opener; Fig. 8 is a perspective view of the spreader; Fig. 9 is a detail view on line 9—9 of Fig. 1, showing the means for adjusting the tube positioning device; Fig. 10 is a sectional detail view substantially on the line 10—10 of Fig. 9; Fig. 11 is a transverse view partially in section showing details of the traveling conveyer or vise; Fig. 12 is a detail view substantially on the line 12—12 of Fig. 2 showing the throw-out idle gear for stopping and starting the machine;

Fig. 13 is a central longitudinal vertical section of the forward or receiving end of the machine showing the tube-positioning device; Fig. 14 is a view similar to Fig. 13, but showing a modified tube positioning device; Figs. 15 and 16 are detail views of the torch and its holder, Fig. 15 being a plan view substantially on the line 17—17 of Fig. 16; and Figs. 17, 18, and 19 are diagrammatic plan views showing the manner of gripping and forwarding lengths of tubes in end to end abutment.

Metallic tubing of the kind herein referred to is usually made by rolling or forming up a long strip of metal. Such tubing is characterized by a longitudinal slit or open seam, the edges being in substantial abutment. The purpose of my invention is to unite these edges uniformly, rapidly, and economically. I accomplish this by placing the tube in a holder which exposes the seam of the tube and by moving the holder and the tube longitudinally at a uniform speed. By directing the flame of a torch which is very intense and quite narrowed or localized upon the seam, the seam edges are fused and thus caused to run together or weld as fast as the tube moves past the torch.

When I use the terms "weld", "welded" and "welding" they should be construed to mean uniting the edges of tubes and similar articles together by heat either with or without the use of additional metal. Such for example as brazing, soldering, and the like, because my invention may be used and contemplates the formation of tubing by these methods. Also the term "flame", herein, should be construed to cover a flame produced in any desired way and also an intense heat such, for example, as an electric arc.

As herein shown, the frame of the machine may comprise a horizontal box or trough B of cast iron supported by legs A at a height convenient for the operator. Bearing standards C, C and C', C', rise from opposite ends of the frame and support a bed plate D. These standards carry bearings for the shafts 1 and 2. Sprockets 4, 4' and 3, 3' are mounted and spaced apart on the shafts 1 and 2, respectively, for purposes which will appear hereinafter. Additional bearing standards 21ᵇ, 21ᵇ rise from the sides of the frame and support the main shaft 21 of the machine. The shaft also has an outboard bearing 20ᵇ′ mounted upon an arm 20ᵇ and is driven at constant speed from the countershaft 20 through the speed reducing worm 22′ and wheel 22. The latter shaft is carried in side brackets 20ᵃ and bears a large pulley P which is driven from any suitable source of power, as by means of the belt P′. A train of gears 2′, 23 and 23′ connects the shaft 2 and 21. The intermediate gear 23′ of this train is carried on a hand lever 23″ pivoted on the shaft 21 whereby it may be swung into and out of operation to start and stop the machine at will. At the forward end of the frame is an upstanding arm 51‴ which supports a guide 51″. This guide supports the tube T and directs it into the machine. The vise or traveling tube holder is substantially horizontally disposed in the frame and is alined with the tube guide 51″ to receive the tubes as they are fed to the machine. The sprockets 3, 3′ and 4, 4′ heretofore mentioned, carry endless elongated chains 5′ and 5 composed of links. Corresponding links of these chains are connected by parallel rods 16, two such rods being provided for each pair of links. These chains travel in unison at constant speed in the manner of an endless belt. Rows or series of gripping jaws 26, 26′ are mounted and laterally movable upon the connecting rods 16. Opposed jaws are arranged in pairs and the ends of one pair of jaws practically meet or abut the ends of the next adjacent pair when they are in a straight line so that those jaws which at any instant constitute the straight working portion or stretch of the vise, form in effect two continuous elongated gripping members or bars. These accommodate a considerable length of tube, and yet because divided into a plurality of sections, these practically continuous gripping members may travel constantly in one direction. The gripping faces 6ᶠ are preferably formed in separate blocks or pieces, 6—6′, as clearly shown in Figs. 5 and 6, to the end that the blocks may be readily removed and replaced by others conforming to tubes of different cross sectional shape. It will be observed that the jaws grasp the greater circumferential portion of the tube, exposing preferably only desired portions of the upper side thereof. The jaws are normally held open by a pin 26ᶜ which is interposed between the jaws of each pair and against which opposed springs 26ᵈ, mounted in openings 26ᵃ in each block act, as is best shown in Figs. 5 and 11. They are spread apart, to clear the tube at the forward end of the mechanism, as they rise into alinement with the tube. On the bed plate D, along the upper side or reach of which this mechanism travels, are two parallel guide or cam bars E and F between which the vise jaws travel and by which they are closed and maintained for a time in clamping engagement with the tube. The forward or receiving ends e and f of these cam bars are curved or flared to receive and slowly close the pairs of jaws in succession as they rise into alinement with the tube, and the rear ends of these cam bars are likewise flared, but more abruptly, so that the jaws will quickly open and release the tube. To insure the positive opening of these jaws, a wedge or spreader 40 is secured to the bed plate D at this place; the point of the spreader being positioned between the rows of jaws. The cam bar F is clamped upon the bed plate by a number of bolts 30. The bolts pass through elongated holes 31 in the bar F, permitting lateral adjustment, whereby the tubing may be subjected to just that degree of lateral pressure needed to hold the seam edges of the tube together and insure a good weld. The lateral thrust on this bar is taken by the horizontal screws 32, which are carried in upstanding lugs 33 on the bed plate D. The cam bar E is similarly arranged on the bed plate D, but the bolts 33′, locked in position by nuts 34′, do not clamp it. Instead they permit it to move laterally. Heavy springs 35 are interposed between the ends of the screws 36 and the edge of the cam bar, thus providing an automatic compensator for the variations due to various causes; such as the expansion of the tube when heated. It will be observed that these parts are all so arranged that the tube holder may be widened or narrowed to adapt the machine to different sizes of tubes. Each vise section or jaw carries one or more small rollers 6$^d$ to reduce the friction incident to the travel thereof upon the cam bars or guides E and F. These rollers are carried in lateral extensions of the jaws and run in grooves in the faces of the cam bars; such engagement prevents the jaws from rising off the bed plate. Beneath the bed plate D is a transverse shaft 45 mounted in slotted bearings 45″, for vertical adjustment. This shaft carries a pair of idler sprockets 45′ which engage the inner side of the lower chain reach. By adjusting set screws 46 the shaft 45 and idler sprockets therewith may be raised and lowered and the tension of the chains thereby regulated.

A pair of standards 60$^a$ rise from the sides of the bed plate and support a horizontal rod or shaft 60. The bridge 60 thus formed supports the welding torch above the vise or tube holder, its position being intermediate the ends thereof. The torch which I have shown in the drawings is of the oxy-acetylene type. It has two gas supply pipes 66 and 66$^a$ which terminate in a gas-mixing chamber 11. This chamber has a finely pointed flame nozzle 11′. The upper ends of the pipes 66 and 66$^a$ terminate in a head which carries gas cocks 11$^a$ and 11$^b$ for proportioning the gases. Supply pipes 11$^d$ from the sources of gas supply are connected to this head. The gas nozzle 11′ is inclined downward toward the tube and toward the entrance guide 51″ and plays a flame upon the seam of the tube as it travels forward. The flame which burns at the end of the nozzle may be said to consist of two portions: a fine, narrow, intensely hot portion which fuses the edges $t, t,$ of the tube and causes them to flow together; and a far-extending corona of lower temperature, which spreads forwardly along the tube. This far-extending or preheating portion of the flame raises the temperature of the metal adjacent the tube seam in advance of the actual welding point and enables a greater welding speed to be obtained. This action is further enhanced by the novel construction of the vise blocks as will be hereinafter explained. In the machine shown, the torch is relatively stationary with respect to the frame of the machine. It is, however, mounted in such manner that it may be accurately positioned. By reference to Figs. 1, 3, 15 and 16, it will be observed that the torch is mounted on a lever 62 which is pivoted at 62′ upon another arm 61. This lever has a handle by which the torch may be quickly swung upwardly clear of the tube, when it is desired to inspect the work. In order, however, that it may be returned instantly to its previous position without readjustment or other manipulation, the free end of the arm 61 is engaged by a stop limit pin 62‴ on the lever 62. For accurate adjustment in a vertical plane, the pipe 66 of the torch is held in a split block 63 rotatably mounted in a socket 63′ in the side of the lever 62. This block has an upstanding lug or projection 64‴ which engages an adjusting screw 67 by which the block is rotated against the opposing action of a spring 67′, also acting against the lug 64‴. By manipulating this screw the torch nozzle may be accurately spaced from the tube seam, and this adjustment will not be destroyed when the torch is swung upwardly and afterward returned to its working position. The split block also permits the torch nozzle to be rotated slightly as required in alining it exactly with the tube seam. Mounted in the split block 63 is a swivel 65 in which the gas pipe 66 of the torch is clamped by a set screw 66′. The torch can thereby be set and held at desired height. The arm 61 has a split collar 60′ which permits it to be adjusted horizontally along the bridge rod 60 and a screw 61″ fixes it in adjusted position. By means of the parts just described the position of the torch may be adjusted to a nicety, and at the same time the torch may be swung clear of the tube and returned to exactly its previous position. A constant welding relation should be maintained between the tube seam and the welding flame in order that the weld may be exactly located at the tube seam as the tube travels. Referring to Figs. 1, 2, 9, 10, 13 and 14, it will be seen that a seam positioning blade G′ is arranged just in advance of the traveling tube holder. This blade or guide may be mounted in a bridge 50 secured on the forward end of the frame A. It may be removably clamped between two blocks $g'$ and $g''$ by the eccentric cam $g$. The blade G' enters the tube seam as the tube feeds into the machine and if the tube seam is in twisted condition the blade, in conjunction with the traveling vise, exerts a twisting or torsional force upon the tube to straighten the seam thereof with respect to the vise and the torch. Thus kinks or irregularities in the tube seam will be automatically corrected and the seam will be presented as a straight line to the welding flame. It is sometimes desirable to use one or more rotary disks in place of the stationary positioning blade G'. Fig. 14 shows a disk 55 mounted on the bridge 50. An additional disk or wheel 55' is mounted on an extension 51 between the disk 55 and the vise. Such disks will wear longer than the fixed blade.

Referring now to Figs. 1, 4, 5 and 6, it will be noted that the jaw sections $6^t$ are provided with extensions or heat localizers $6^x$ which preferably flare slightly on their inner sides and extend outward beyond the tube clamping surfaces of the jaws. The purpose of these extensions $6^x$ is to form a comparatively deep heat retaining groove in the top of the traveling vise. As shown, the nozzle of the torch and the flame thereof enter this groove and it will be obvious that the walls of the groove thus formed serve to direct and confine the heat upon the top and seam edges of the tube, thereby greatly facilitating the welding of the edges.

The pre-formed tubes to be welded are started through the guide 51'' into the traveling tube holder; by which they are carried bodily along beneath the welding torch, one tube immediately following the other in continuous series, the ends $t^e$ of the tubes being in end to end abutment. As each tube is carried along by the moving holder the irregularities in the seam are automatically corrected by the seam positioning mechanism, and the seam is thus presented by the holder in exact alinement with the welding flame. It will be observed that the device grasps the tube for a considerable portion of its length and holds the tube edges in proper welding relation, and at the same time holds respective tubes in intimate end to end abutment so that there is no possibility of the flame of the torch eating into the end of the tube as new length is presented thereto. And in fact the respective definite length tubes when gripped in my unique holder form a substantially continuous tube. I am thereby enabled to weld definite lengths of tubes continuously and without any waste either of time or material due to imperfect welding at the tube ends.

The torch is positioned above the traveling holder intermediate its ends, and hence the tube is not only firmly held by the holder in advance of the welding point, but it is also held undisturbed after the weld is formed for a sufficient length of time to allow the tube to lose its heat through radiation into the surrounding air and the massive gripping parts of the holder. By the time the tube has emerged from the rear end of the machine it has cooled to a great extent and there is no danger that the weld will open. In order that the vise jaws may be kept cold, they are arranged to travel through the trough (frame) B which is filled with water. If desired, a constant water circulation may be maintained by providing a water inlet $b'$ (Fig. 3) and an overflow pipe $b''$.

During the welding operation a raised seam or bur $t^b$ usually forms on the top of the tubing. This bur is shown somewhat exaggerated in Fig. $6^a$. It is desirable to remove the bur so that the completed tube will be smooth and uniform. As previously stated the tube is practically cold when it reaches the rear portion of the machine and for that reason I prefer to locate the bur remover at that point. If the bur remover were located where the tube is still hot it would be detrimentally affected by the heat thereof. The bur removing mechanism 80, shown in Figs. 1, 2 and $6^a$, comprises a planer knife or tool 81, positioned in alinement with the tubing. The bottom or working edge of the tool 81 conforms to the top of the tubing. I prefer to arrange the knife or tool at an angle to the horizontal axis of the tubing in order that the cutting efficiency may be increased. To this end it is rigidly bolted to the angled portion 84 of the cross standard 85, by stud bolts 83. The knife is provided with a slot to accommodate the bolts and to permit vertical adjustment. The standard 85 is bolted to the bed plate D, and is bowed upward freely to span the traveling vise jaws. As the tubing travels beneath the sharp edge of the planer tool 81, the latter cuts or scrapes off the raised seam or bur $t^b$ leaving the top of the tubing in a smooth and finished condition like the other portions of the tube. The seam or weld in the tube after thus finished is practically invisible and the tube has the appearance of and may be considered and treated as a seamless tube.

It will be obvious that while my process is particularly adapted for welding tubes, it may be used for welding other articles which present longitudinally disposed seams.

By my unique method I am thus enabled to weld lengths of tubes continually. I am enabled to secure a full unit of welded tube from a unit of unwelded tube, because there is no danger of the flame cutting through the tube either within the confines of one tube or at the ends as successive tubes approach. There are therefore no waste ends, which not only saves the material but also saves the expense required in rehandling same to cut off the waste portion.

I claim:—

1. The herein described process of continuously welding lengths of tubing which consists in placing a plurality of tubes in end to end abutment, holding them in this position, moving them forward, and applying heat thereto at a relatively fixed point, and thus welding the tubes as they move.

2. The herein described process of continuously welding lengths of elongated articles having longitudinally disposed seams which consists in placing a plurality thereof in end to end abutment, holding them in this position and moving them forward, applying heat to the seam edges of the article, and thereby welding the respectively abutted tubes as they move.

3. The herein described process of continuously welding lengths of elongated articles having longitudinally disposed seams, which consists in placing a plurality thereof in end to end abutment, applying forces thereto to aline the seams in a predetermined position, holding them in this position, moving them forward and applying heat to the seam edges and thereby welding the respectively abutted tubes as they move.

4. A process of continuously welding lengths of tubing which consists in placing a plurality of longitudinally seamed tubes in end to end abutment, applying forces to hold same in this position, move them forward, applying heat to the seam edges at a relatively fixed point, and applying pressure permanently to unite the seam.

5. The herein described process of welding tube lengths and similar articles having longitudinally disposed seams, which consists in holding the ends of two tubes simultaneously in end to end abutment, moving them forward, applying heat to the seam edges thereof at a relatively fixed point, and applying compressive forces to the tubes to close the seam, thereby welding the articles as they move.

6. The process of continuously welding lengths of tubing and the like, which consists in moving and holding tubing, feeding other tubing thereto, gripping same to hold it in end to end abutment with the first tubing, and moving it forward therewith, and applying welding heat to the tubing moved, thereby welding successive portions thereof.

7. The process of continuously welding lengths of tubing, which consists in applying forces to hold the seam edges of the metal tube together and to move the tube forward as a whole, applying heat to the seam edges of the tube at a relatively fixed point and uniting the seam as the tube moves, and before the tube is welded throughout its length placing another seamed tube in end to end abutment therewith and applying similar forces thereto to hold the seam edges together, and to move the second tube forward past the relatively fixed heating zone, and thus continuously welding lengths of tubing.

8. The process of welding preformed tubes having longitudinally disposed seams which consists in applying forces to hold the seam edges of the metal together and to move the tube forward as a whole, applying heat to the seam edges of the tube at a relatively fixed point and thereby welding the tube as it moves, and before the tube is welded throughout its entire length placing a similar tube in end to end abutment therewith, applying forces thereto to aline the seams of the two tubes, moving the second tube forward past the relatively fixed heating zone, and thus continuously welding lengths of tubing.

9. The process of continuously welding lengths of tubing having longitudinally extending seams which consists in applying forces to aline the seam edges of the metal with a predetermined relatively fixed heating zone, moving the tube forward as a whole, applying heat to the seam edges of the tube at a relatively fixed point and thereby welding the seam as the tube moves, and before the tube is welded throughout its entire length placing a similar seamed tube in end to end abutment therewith, moving the second tube forward past the relatively fixed heating zone and thus continuously welding the lengths of tubing.

10. The process of continuously welding lengths of preformed tubing having longitudinally extending seams which consists in applying forces thereto to hold the seam edges of the metal tube together, moving the tube forward as a whole, and simultaneously positioning the seam edges in line with a predetermined heating zone, applying heat to the seam edges of the tube at a relatively fixed point as thus held and moved, and thereby welding the tube as it moves, and before the tube is welded throughout its entire length placing a similarly seamed tube in end to end abutment therewith, applying similar forces thereto to hold the seam edges together, moving the second tube forward in continued end to end abutment past the relatively fixed heating zone, and thus continuously welding definite lengths of tubing.

11. The process of continuously welding lengths of tubing and the like having longitudinally extending seams which consists in moving the tubing forward, applying heat to the seam edges thereof at a relatively fixed point, applying compressively acting forces to the tube at the point of heat application, thereby uniting the seam edges as they move, and before the tube is welded throughout its entire length placing a similarly seamed tube in end to end abutment therewith, moving the second tube forward in continued end to end abutment past the heating zone and applying compressively acting forces thereto adjacent the heating zone, thus continuously welding lengths of tubing.

12. The herein described process of continuously welding preformed lengths of tubing having longitudinally extending seams, which consists in placing two tubes in end to end abutment, moving said tubes forward in continued end to end abutment, applying heat to the seam edges thereof at a relatively fixed point and compressively gripping the said tubes for a distance at each side of the abutted ends while heat is applied to the seam edges as the tubes move past the relatively fixed heating zone.

13. The herein described process of continuously welding preformed lengths of tubing having longitudinally extending seams, which consists in placing two tubes in end to end abutment, moving said tubes forward in continued end to end abutment, applying forces thereto to aline the seams of respective tubes, applying heat to the seam edges thereof at a relatively fixed point and compressively gripping the said tubes for a distance at each side of the abutted ends while heat is applied to the seam edges as the tubes move past the relatively fixed heating zone.

14. The herein described process of continuously welding lengths of tubing and the like having longitudinally extending seams which consists in placing one tube in end to end abutment with another, applying forces thereto to hold the seam edges of the metal together and to move the tubes forward in continued end to end abutment, impinging a welding flame upon the seam edges of the tubes at a relatively fixed point, thereby uniting the seams as the tubes move and applying compressively acting forces to a portion of each tube adjacent the abutted ends as the tubes approach the relatively fixed flame and thus continuously welding lengths of tubing.

In testimony whereof, I have hereunto set my hand, this 18th day of February, 1914, in the presence of two subscribing witnesses.

MARSHALL BURNS LLOYD.

Witnesses:
R. G. WAIS,
C. O. PORTERFIELD.